United States Patent Office 3,328,425
Patented June 27, 1967

3,328,425
OXIRANYL THIIRANE AND ITS PREPARATION
Sheldon I. Schlesinger, Trenton, N.J., assignor to Thiokol Chemical Corporation, Bristol, Pa., a corporation of Delaware
No Drawing. Filed June 13, 1963, Ser. No. 287,526
6 Claims. (Cl. 260—327)

The present invention relates to a novel, polymerizable compound, oxiranyl thiirane (dl-1,2-epoxy-3,4-epithiobutane) which has the structure

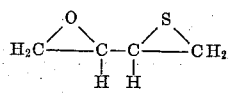

Recent developments in the field of episulfide chemistry have provided the art with high molecular weight homopolymers and interpolymers of styrene sulfide and alkylene sulfides such as ethylene sulfide, propylene sulfide, butylene sulfide (1,2-butylene sulfide and/or 2,3-butylene sulfide), isobutylene sulfide and cyclohexane sulfide. These polymers as such, however, are not readily curable and it is preferable, in order to obtain the optimum in physical and solvent resistance properties in polymers of this type, that they be curable. Attempts to prepare curable interpolymers using epoxy group containing monomers, such as allylglycidylether, to provide cure sites in such interpolymers have been unsuccessful to date.

An object of the present invention, therefore, is to provide a novel, polymerizable monomer which can be readily interpolymerized with any one or more of the alkylene sulfides and/or styrene sulfide so as to thereby provide curable, episulfide polymers.

A further object of the present invention is to provide novel episulfide interpolymers.

It has been unexpectedly found that curable, episulfide interpolymers may be prepared if there is incorporated in the polymer about 8 to 12 mol percent of oxiranyl thiirane (dl-1,2-epoxy-3,4-epithiobutane). This compound is a water white liquid.

Oxiranyl thiirane may be prepared, according to the present invention by reacting butadiene dioxide with an excess, or preferably more than two molar proportions, of an alkali metal thiocyanate such as potassium thiocyanate. The reaction, when conducted in an aqueous medium, requires temperatures of below about 5–7° C. to avoid side reactions and/or the polymerization of the desired monomer product. The reaction is preferably conducted in a nonaqueous solvent, such as anhydrous dioxane, due to the occurrence of the side reaction in the aqueous systems. Using dioxane, the monomer may be prepared in its purest form and in the highest yields. The monomer may be recovered from the reaction system by extraction with ethyl ether or chloroform followed by drying and fractional distillation.

Oxiranyl thiirane may be interpolymerized with styrene sulfide or alkylene sulfides using catalysts such as cadmium hydroxide.

In order to prepare curable type interpolymers, the reaction is preferably carried out at temperatures of about 40 to 65° C. in the presence or absence of water or organic solvents such as benzene and can be accomplished in about 5 to 30 hours or more. During the polymerization using the cadmium hydroxide catalyst mentioned above, the episulfide rings in the oxiranyl thiirane and the other episulfide monomers employed according to the present invention, open up and the monomers interpolymerize through the opened episulfide rings. The epoxide groups in the oxiranyl thiirane do not enter into the polymerization reaction with the cadmium hydroxide catalyst referred to above and as such are available for subsequent crosslinking reactions through the epoxide rings.

The following examples are merely illustrative of the present invention and are not intended as a limitation upon the scope thereof.

EXAMPLE 1

*Preparation of oxiranyl thiirane monomer in anhydrous dioxane*

A two liter, three necked reaction flask, equipped with a glass stirrer, reflux condenser and a drying tube was charged with 86 grams (1.00 mole) of butadiene dioxide, 265 grams (2.73 moles) of potassium thiocyanate and 500 ml. of anhydrous dioxane. This mixture was stirred at room temperature for two weeks and then at 60° C. for 24 hours. After standing at room temperature for another month the reaction mixture was filtered through a Buchner funnel and the insoluble residue on the filter washed with ether. The filtrate and ether washings were combined and fractionally distilled under reduced pressure through a column packed with glass helices. Eight cuts were collected, boiling from 25° C./10 mm. to 36° C./2 mm., using a reflux ratio of 1:8. The purest fraction as determined by gas chromatography was 94% and boiled at 36° C./2 mm. This cut had a refractive index ($n_D^{25}$) of 1.5271 and a yield of 10% oxiranyl thiirane.

*Preparation of oxiranyl thiirane/propylene sulfide interpolymer*

A clean, dry 30 ounce reaction bottle was charged with 95 grams (1.28 moles) of propylene sulfide, 18 grams (0.176 mole) of oxiranyl thiirane prepared as above, 0.2 gram of of cadmium hydroxide and 200 ml. of dry benzene. The bottle was sealed and the contents were reacted for 16 hours at 65° C. The bottle was cooled and opened revealing an interpolymer of oxiranyl thiirane and propylene sulfide capable of being cured into a tough rubber like material insoluble in chloroform.

EXAMPLE 2

*Preparation of oxiranyl thiirane monomer in aqueous medium*

A one liter, three necked reaction flask which was equipped with a stirrer, a thermometer and an addition funnel was charged with 250 ml. of distilled water and 321 grams (3.31 moles) of reagent grade potassium thiocyanate. By means of the addition funnel, 135 grams (1.57 moles) of butadiene dioxide (1,2-3,4-diepoxybutane) was then added dropwise over a period of 35 minutes while the mixture was being stirred and cooled in an ice bath. The maximum temperature reached during this addition was +7° C. The reaction was continued for 2 hours, during which the temperature ranged from −7° C. to +4° C. The reaction mixture was removed and extracted with two 50 ml. portions of ethyl ether. The ether extract was dried overnight over sodium sulfate and magnesium sulfate and then the ether removed by evaporation. The residue was then fractionally distilled under reduced pressure. The fraction distilling at between 40.0° C. and 42.5° C. and at a pressure of 1.8 mm. Hg and with a pot temperature of between 47.5° C. and 53° C. was found to have a refractive index (at 22.2° C.) of 1.5202. The yield was 19.3 grams (12.6%).

*Preparation of oxiranyl thiirane/propylene sulfide interpolymer*

A clean, dry 30 ounce reaction bottle was charged with 65 grams (0.88 mole) of propylene sulfide, 10 grams (0.098 mole) of oxiranyl thiirane prepared as above, 0.2 gram of cadmium hydroxide and 100 ml. of dry benzene. The bottle was sealed and reacted for 16 hours at 65° C. The bottle was cooled, opened and the gelled contents transferred into petroleum ether. The gel was further washed with petroleum ether and dried under vacuum at 50° C. to a constant weight. The resultant interpolymer was a snappy rubber, insoluble in boiling chloroform and obtained in a 77% yield.

I claim:
1. A process for preparing oxiranyl thiirane which comprises reacting butadiene dioxide with a more than two molar excess of an alkali metal thiocyanate and recovering the oxiranyl thiirane from the reaction system.
2. A process as in claim 1 in which said alakali metal thiocyanate is potassium thiocyanate.
3. A process as in claim 1 in which the reaction is conducted in a solvent.
4. A process as in claim 3 in which said solvent is dioxane.
5. A process as in claim 3 in which said solvent is water and said reaction is conducted below about 5 to 7° C.
6.

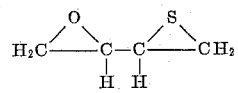

References Cited
UNITED STATES PATENTS

| | | | |
|---|---|---|---|
| 2,962,457 | 11/1960 | Mackinney | 260—3 |
| 3,069,396 | 12/1962 | Middleton | 260—79 |
| 3,071,593 | 1/1963 | Warner | 260—327 |
| 3,136,744 | 6/1964 | McGrew | 260—79 |
| 3,136,781 | 6/1964 | Middleton | 260—327 |

WALTER A. MODANCE, *Primary Examiner.*

LEON J. BERCOVITZ, *Examiner.*

M. I. MARQUIS, JAMES A. PATTEN,
*Assistant Examiners.*